(12) United States Patent
Fujii et al.

(10) Patent No.: US 8,907,985 B2
(45) Date of Patent: Dec. 9, 2014

(54) IMAGE DISPLAY DEVICE AND IMAGE DISPLAY METHOD

(75) Inventors: Hirofumi Fujii, Kanagawa (JP); Sumio Yokomitsu, Tokyo (JP); Takeshi Fujimatsu, Kanagawa (JP); Takeshi Watanabe, Kanagawa (JP); Yuichi Matsumoto, Kanagawa (JP); Michio Miwa, Chiba (JP); Masataka Sugiura, Tokyo (JP); Mikio Morioka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 187 days.

(21) Appl. No.: 13/582,318

(22) PCT Filed: Nov. 8, 2010

(86) PCT No.: PCT/JP2010/006551
§ 371 (c)(1),
(2), (4) Date: Aug. 31, 2012

(87) PCT Pub. No.: WO2011/108043
PCT Pub. Date: Sep. 9, 2011

(65) Prior Publication Data
US 2013/0002712 A1 Jan. 3, 2013

(30) Foreign Application Priority Data
Mar. 4, 2010 (JP) ................. 2010-047863

(51) Int. Cl.
*G09G 5/00* (2006.01)
*H04N 5/262* (2006.01)
*G06T 7/20* (2006.01)
*G08B 13/196* (2006.01)
*H04N 5/232* (2006.01)

(52) U.S. Cl.
CPC ............ *H04N 5/2628* (2013.01); *G06T 7/2006* (2013.01); *G08B 13/19602* (2013.01); *G06B 13/19608* (2013.01); *H04N 5/23229* (2013.01); *H04N 5/23238* (2013.01); *G06T 2207/10016* (2013.01); *G06T 2207/30196* (2013.01); *G06T 2207/30232* (2013.01)
USPC ............................ 345/649; 345/659; 345/689

(58) Field of Classification Search
CPC .................. G09G 2340/0492; G05B 19/40935
USPC ........................................ 345/649, 659, 689
See application file for complete search history.

(56) References Cited

U.S. PATENT DOCUMENTS

2004/0104996 A1* 6/2004 Hayashi et al. ................. 348/36
2006/0221185 A1* 10/2006 Miyamaki et al. ............ 348/159

(Continued)

FOREIGN PATENT DOCUMENTS

| EP | 2 034 734 | 3/2009 |
|---|---|---|
| JP | 2001-86375 | 3/2001 |

(Continued)

OTHER PUBLICATIONS

International Search Report, dated Feb. 15, 2011, for corresponding International Application No. PCT/JP2010/006551.

(Continued)

*Primary Examiner* — Joni Richer
*Assistant Examiner* — Yi Yang
(74) *Attorney, Agent, or Firm* — Greenblum & Bernstein, P.L.C.

(57) ABSTRACT

An image display device is configured to cut out and display a moving object within an omnidirectional image. The image display device includes: a moving object position acquisition unit configured to acquire a position of the moving object within the omnidirectional image; a determination unit configured to determine whether to correct an upward direction of a cutout image; a parameter correction unit configured to correct a cutout parameter when the determination unit determines to correct the upward direction of the cutout image; a cutout unit configured to cut images including the moving object out of the omnidirectional image based on the cutout parameter corrected by the parameter correction unit; and a display unit configured to display the images including the moving object, which are cut out by the cutout unit.

6 Claims, 18 Drawing Sheets

(56) References Cited

U.S. PATENT DOCUMENTS

| | | | |
|---|---|---|---|
| 2007/0285388 A1* | 12/2007 | Ogasawara | 345/157 |
| 2008/0159652 A1 | 7/2008 | Shimizu | |
| 2009/0015675 A1* | 1/2009 | Yang | 348/148 |
| 2009/0086061 A1 | 4/2009 | Asoma | |
| 2010/0045826 A1 | 2/2010 | Ogawa | |
| 2010/0220194 A1* | 9/2010 | Ishiko et al. | 348/169 |

FOREIGN PATENT DOCUMENTS

| | | |
|---|---|---|
| JP | 2001-333422 | 11/2001 |
| JP | 2006-211105 | 8/2006 |
| JP | 2007-311860 | 11/2007 |
| WO | 01/20901 | 3/2001 |
| WO | 2007/018097 | 2/2007 |

OTHER PUBLICATIONS

Extended European Search Report from European Patent Office (E.P.O.), mailed Oct. 17, 2013, in the corresponding European patent application.

* cited by examiner

IMAGE DISPLAY DEVICE AND IMAGE DISPLAY METHOD

TECHNICAL FIELD

The present invention relates to an image display device and an image display method suitably used in a security camera system using an omnidirectional camera that acquires an omnidirectional image of 360 degrees.

BACKGROUND ART

Up to now, there has been proposed that the omnidirectional image of 360 degrees is acquired, and a desired image is extracted from the acquired omnidirectional image to create and display a new image. For example, "an image generating device and system" disclosed in Patent literature 1 sets a center orientation and a field angle of surrounding images acquired from one or a plurality of cameras, and extracts images having the set center orientation as the center position and located in a range corresponding to the set field angle, from all of a part of the acquired surrounding images, to create a panorama image.

Also, up to now, there has been proposed that a desired image is cut out of shot images that have been sequentially shot, and enlarged and displayed. For example, "an image processing device, a cameral device, and an image processing method" disclosed in Patent Literature 2 detect a moving portion of a shot image caused by a change in an object from the shot images obtained by sequential shooting, cut out an area including the shot image of the detected moving portion as a moving area image, subject the cutout moving area image to correction processing of distortion caused by a taking lens, enlarge the cutout moving area image, and to enlargement processing, and generate a corrected enlarged image.

Incidentally, when the omnidirectional camera is installed so that an optical axis thereof extends just downward, an intended image (for example, a person image) is detected by the aid of differential information from the omnidirectional image obtained by the camera, and an image is cut into a given rectangular shape centered on the detected intended image, outward directions from a center of the omnidirectional image match upward directions of the cutout image. An outline of this configuration is illustrated in FIG. 16. In the figure, a point indicated by reference numeral 100 denotes an image center, and images indicated by reference numeral 110 are cutout images. Also, arrows indicated by reference numeral 120 are upward directions of the cutout images. Also, FIG. 16 illustrates only frames representative of the rectangular cutout images 110, and the omnidirectional image (a portion indicated by a circle 130 indicates the omnidirectional image) is omitted.

RELATED ART DOCUMENTS

Patent Documents

Patent Literature 1: JP-A-2006-211105
Patent Literature 2: JP-A-2007-311860

SUMMARY OF THE INVENTION

Problem to be Solved by the Invention

However, when the images are cut out so that the outward direction from the image center matches the upward direction of the cutout images, and the camera tracks a moving object (not shown, for example, "person") that passes nearly under the camera as illustrated in FIG. 17, the cutout images each including the moving object are so changed as to rotate, resulting in such a problem that the images are hard to view. Also, as illustrated in FIG. 18, the cutout images turn upside down as soon as the cutout center passes under the camera, resulting in such a problem that the images are hard to view, likewise. When the images are cut out so that the outward direction from the image center matches the upward direction of the cutout images, there arises such a problem that the cutout images of the moving object that passes nearly under the camera are hard to view.

The present invention has been made in view of the above circumstances, and an object of the present invention is to provide an image display device and an image display method, in which a rotation change of the cutout images each including the moving object is suppressed when the omnidirectional camera tracks the moving object that passes nearly under the omnidirectional camera, and also the cutout images flips vertically when the moving object passes under the omnidirectional camera, whereby easily viewable image display is always enabled.

Means for Solving the Problem

An image display device of the present invention is configured to cut out and display a moving object within an omnidirectional image, and the image display device includes: a moving object position acquisition unit configured to acquire a position of the moving object within the omnidirectional image; a determination unit configured to determine whether to correct an upward direction of a cutout image; a parameter correction unit configured to correct a cutout parameter when the determination unit determines to correct the upward direction of the cutout image; a cutout unit configured to cut images including the moving object out of the omnidirectional image based on the cutout parameter corrected by the parameter correction unit; and a display unit configured to display the images including the moving object, which are cut out by the cutout unit.

The image display device described above further includes a rotating speed calculation unit configured to calculate a rotating speed of the image based on coordinates of a moving position of the moving object within the omnidirectional image, which are acquired by the moving object position acquisition unit, and the determination unit determines to correct the upward direction of the cutout image when a highest rotating speed of the rotating speeds calculated by the rotating speed calculation unit is equal to or larger than a given threshold value.

The image display device described above further includes: a coordinate conversion unit configured to transform the coordinates of the moving position of the moving object, which are acquired by the moving object position acquisition unit, to coordinates on a real space plane; and a rotating speed calculation unit configured to calculate the rotating speed of the image based on the coordinates on the real space plane which are obtained by the coordinate conversion unit, and the determination unit determines to correct the upward direction of the cutout image when the highest rotating speed of the rotating speeds calculated by the rotating speed calculation unit is equal to or larger than a given threshold value.

In the image display device described above, the moving object position acquisition unit includes: a moving object detection unit configured to detect the moving object according to the omnidirectional image; a moving object position storage unit configured to store a position of the moving object which is detected by the moving object detection unit; and a moving position prediction unit configured to predict the moving position of the moving object based on the position of the moving object which is stored in the moving object position storage unit.

In the image display device described above, the moving object position acquisition unit reads the position of the moving object according to the omnidirectional image recorded in advance.

The image display device described above further includes: an upward direction determination unit configured to determine the upward direction of cutout of the image when the moving object enters an upward direction fixed area; and an upward direction storage unit configured to store the upward direction of the cutout of the image which is determined by the upward direction determination unit, and the determination unit determines to correct the upward direction of the cutout image when the moving object is located in the upward direction fixed area based on the coordinates of the moving position of the moving object within the omnidirectional image, which is acquired by the moving object position acquisition unit.

An image display method of the present invention is for cutting out and displaying a moving object within an omnidirectional image, and the image display method includes: a moving object position acquisition step of acquiring a position of the moving object within the omnidirectional image; a determination step of determining whether to correct an upward direction of a cutout image; a parameter correction step of correcting a cutout parameter when it is determined in the determination step to correct the upward direction of the cutout image; a cutout step of cutting images including the moving object out of the omnidirectional image based on the cutout parameter corrected in the parameter correction step; and a display step of displaying the images including the moving object, which are cut out in the cutout step.

Advantages of the Invention

According to the present invention, a rotation change of the cutout images each including the moving object is suppressed when the omnidirectional camera tracks the moving object that passes nearly under the omnidirectional camera, and also the cutout images flips vertically when the moving object passes under the omnidirectional camera, whereby easily viewable image display is always enabled.

MODE FOR CARRYING OUT THE INVENTION

Hereinafter, preferred embodiments for carrying out the present invention will be described in detail with reference to the drawings.

First Embodiment

Figure 1:
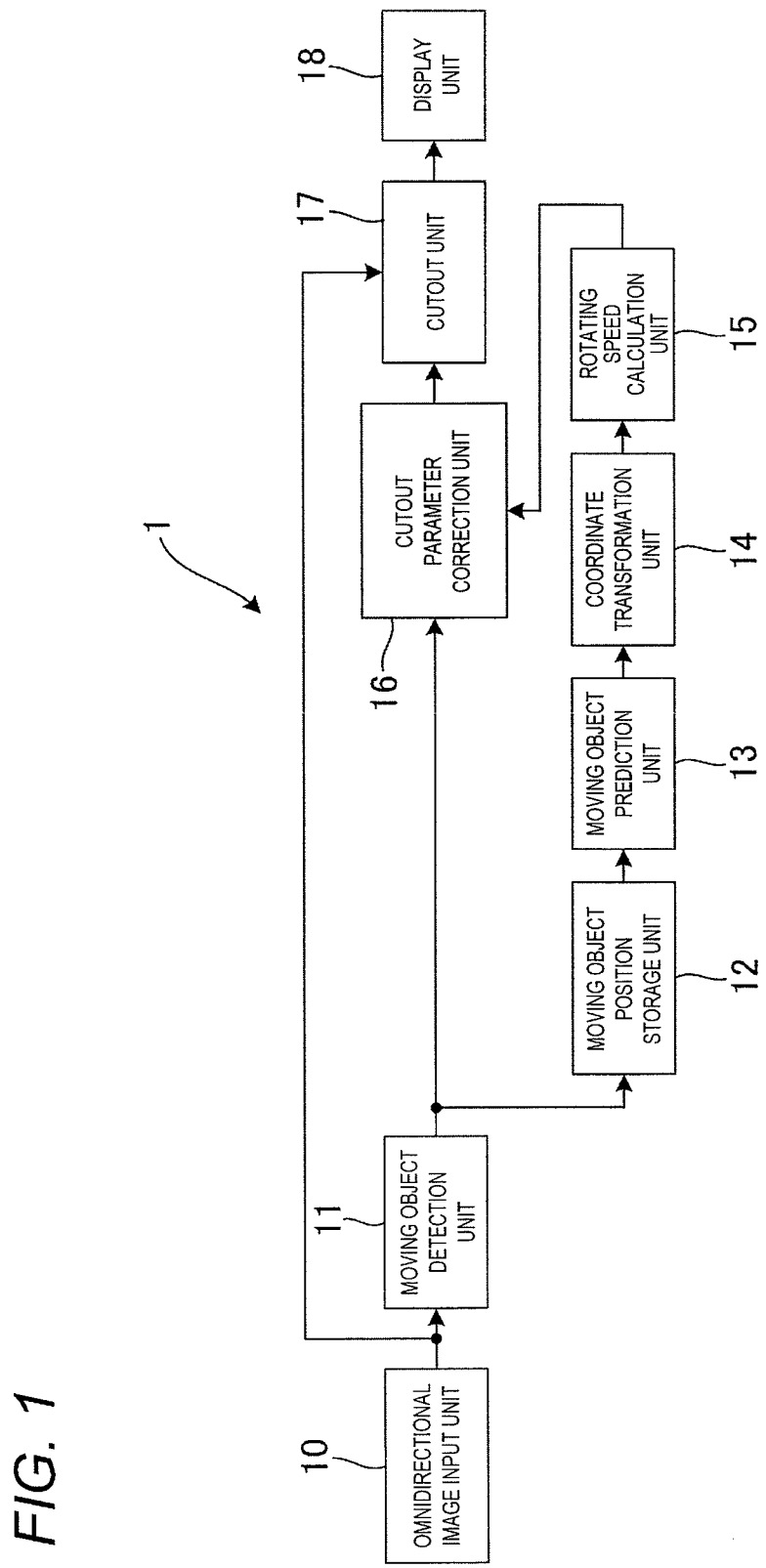
FIG. 1 is a block diagram illustrating a rough configuration of an image display device according to a first embodiment of the present invention.

FIG. 1 is a block diagram illustrating a rough configuration of an image display device according to a first embodiment of the present invention. In the figure, an image display device 1 according to this embodiment is mainly applied to a security camera system that monitors a moving object (for example, person). The image display device 1 includes an omnidirectional image input unit 10, a moving object detection unit 11, a moving object position storage unit 12, a moving position prediction unit 13, a coordinate transformation unit 14, a rotating speed calculation unit 15, a cutout parameter correction unit 16, a cutout unit 17, and a display unit 18.

Figure 2:
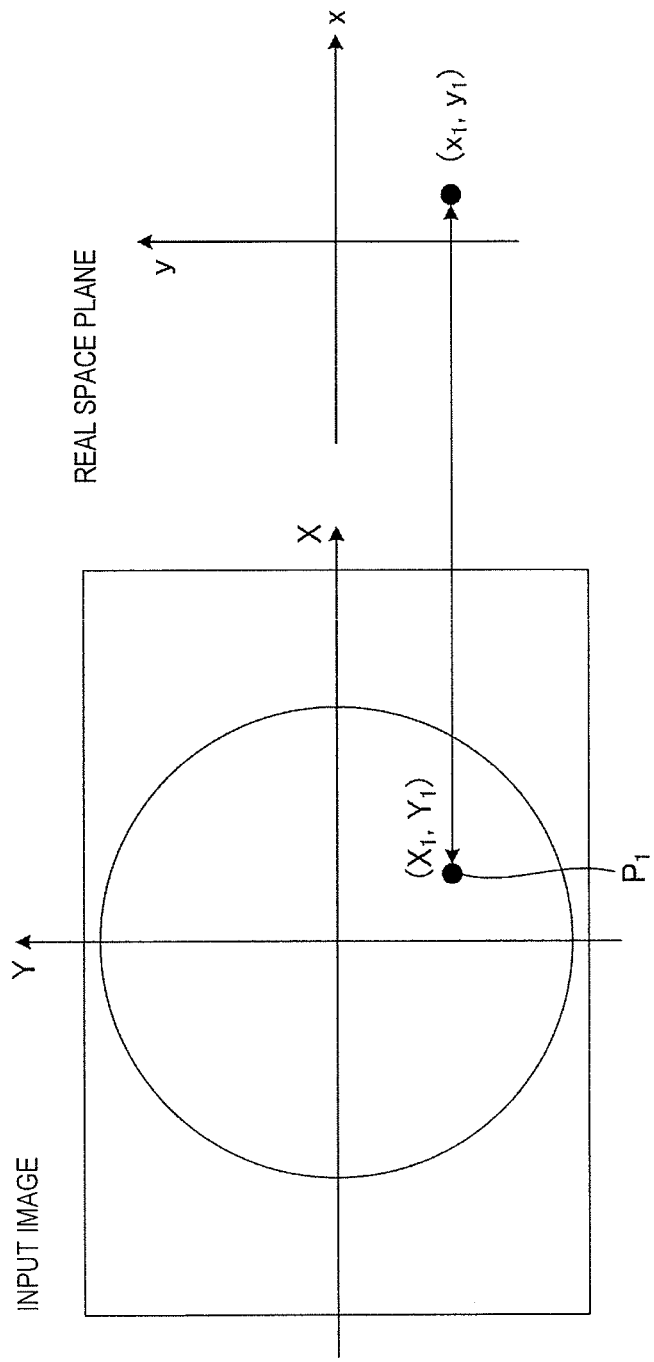
FIG. 2 is a schematic diagram illustrating an appearance of coordinate transformation by a coordinate transformer in the image display device of FIG. 1.

The omnidirectional image input unit 10 receives an omnidirectional image from an omnidirectional camera not shown. The moving object detection unit 11 detects a moving object to be tracked from the omnidirectional image received by the omnidirectional image input unit 10. The moving object position storage unit 12 stores a position stored in the moving object detection unit 11. The moving position prediction unit 13 predicts a moving position of the moving object based on the position of the moving object stored in the moving object position storage unit 12. The coordinate transformation unit 14 transforms the coordinates of the moving position of the moving object predicted by the moving position prediction unit 13 into coordinates on a real space plane. FIG. 2 is an example schematically illustrating an appearance of the coordinate transformation by the coordinate transformation unit 14, which transforms coordinates $(X_1, Y_1)$ of the moving position $P_1$ of the moving object into coordinates $(x_1, y_1)$ on the real space plane.

Figure 3:
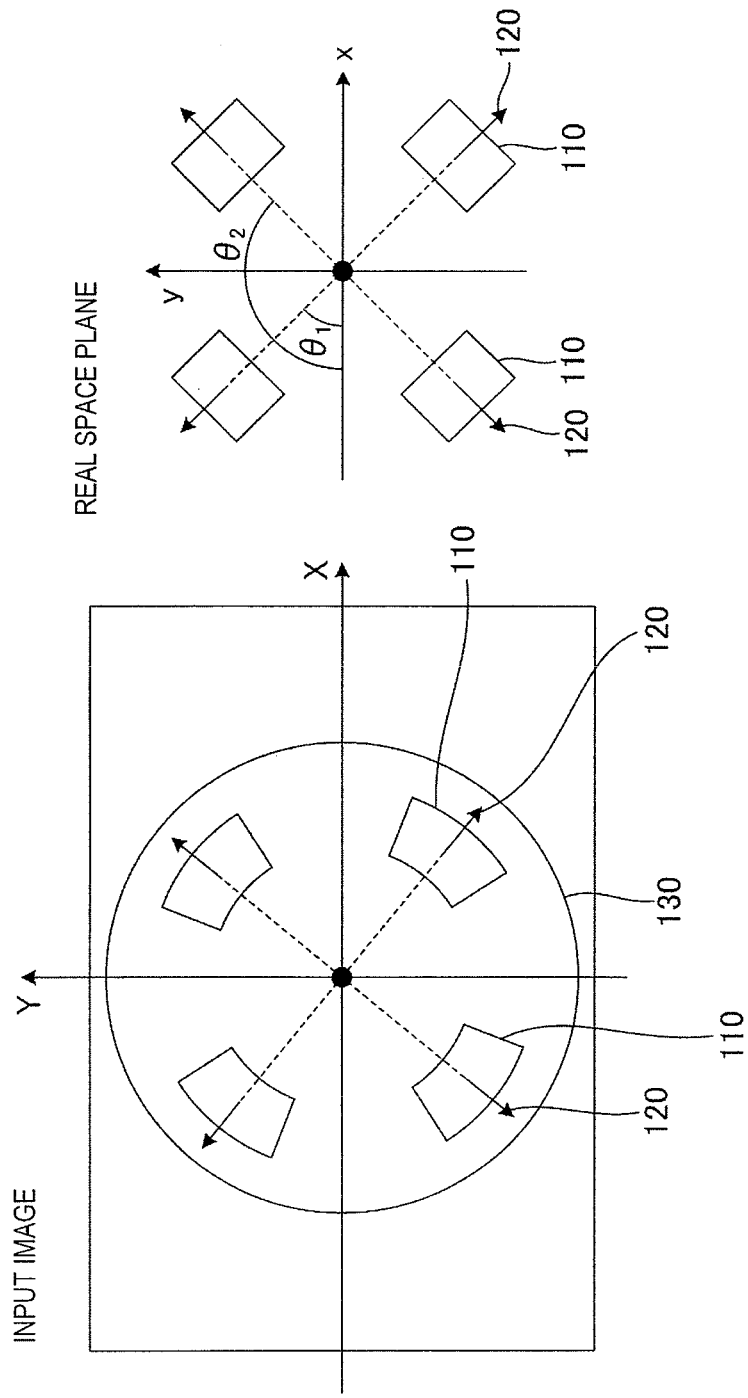
FIG. 3 is a diagram illustrating an example in which input images input to the image display device of FIG. 1 and cutout images are subjected to coordinate transformation on a real space plane.

The rotating speed calculation unit 15 calculates a rotating speed in an image direction based on the coordinates on the real space plane obtained by the coordinate transformation unit 14. FIG. 3 is an example in which a cutout image 110 is subjected to coordinate transformation on the real space plane. The rotating speed can be calculated by using an angular difference $(\theta_2-\theta_1)$ between two vectors on the real space plane. After the predicted position of the moving object has been subjected to the coordinate transformation on the real space plane, the rotating speed is calculated by using the angular difference between the two vectors on the real space plane.

Figure 4:
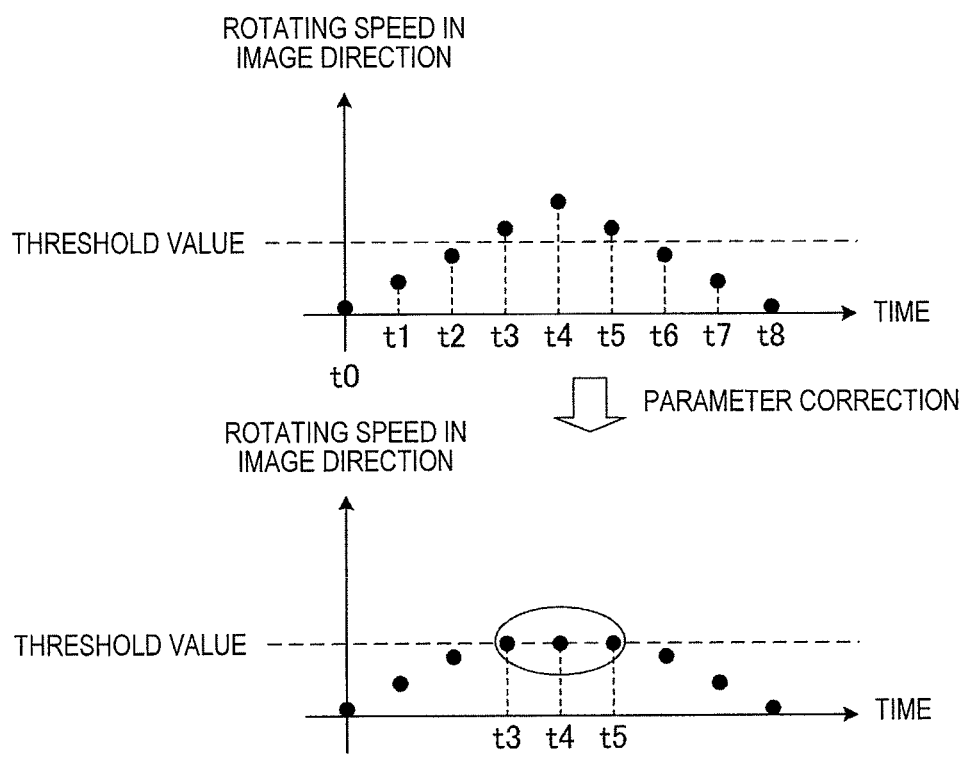
FIG. 4 is a diagram illustrating the operation of the image display device in FIG. 1.

The cutout parameter correction unit 16 corrects a cutout parameter which is a parameter for designating the upward direction of the images when the highest rotating speed of the rotating speeds calculated by the rotating speed calculation unit 15 is equal to or larger than a given threshold value. The parameter is corrected so that a total of the rotating speeds is not changed, and the rotating speed does not exceed the threshold value at any time. As a result, start and end rotating angles of a parameter correction zone can match a parameter non-correction zone, and the highest rotating speed in the parameter correction interval can be suppressed. For example, as illustrated in FIG. 4, the cutout parameter is corrected so that the respective rotating speeds at three times $t_3$ to $t_5$, which exceed the threshold value, become equal to or smaller than the threshold value, and an integral value (rotating angles at the times $t_0$ to $t_8$) of the rotating speeds in the zones of the times $t_0$ to $t_8$ becomes identical with each other. The cutout unit 17 cuts the images including the moving object out of the omnidirectional image by the aid of the cutout parameter corrected by the cutout parameter correction unit 16. The display unit 18 displays the images including the moving object cut out by the cutout unit 17.

Figure 5:
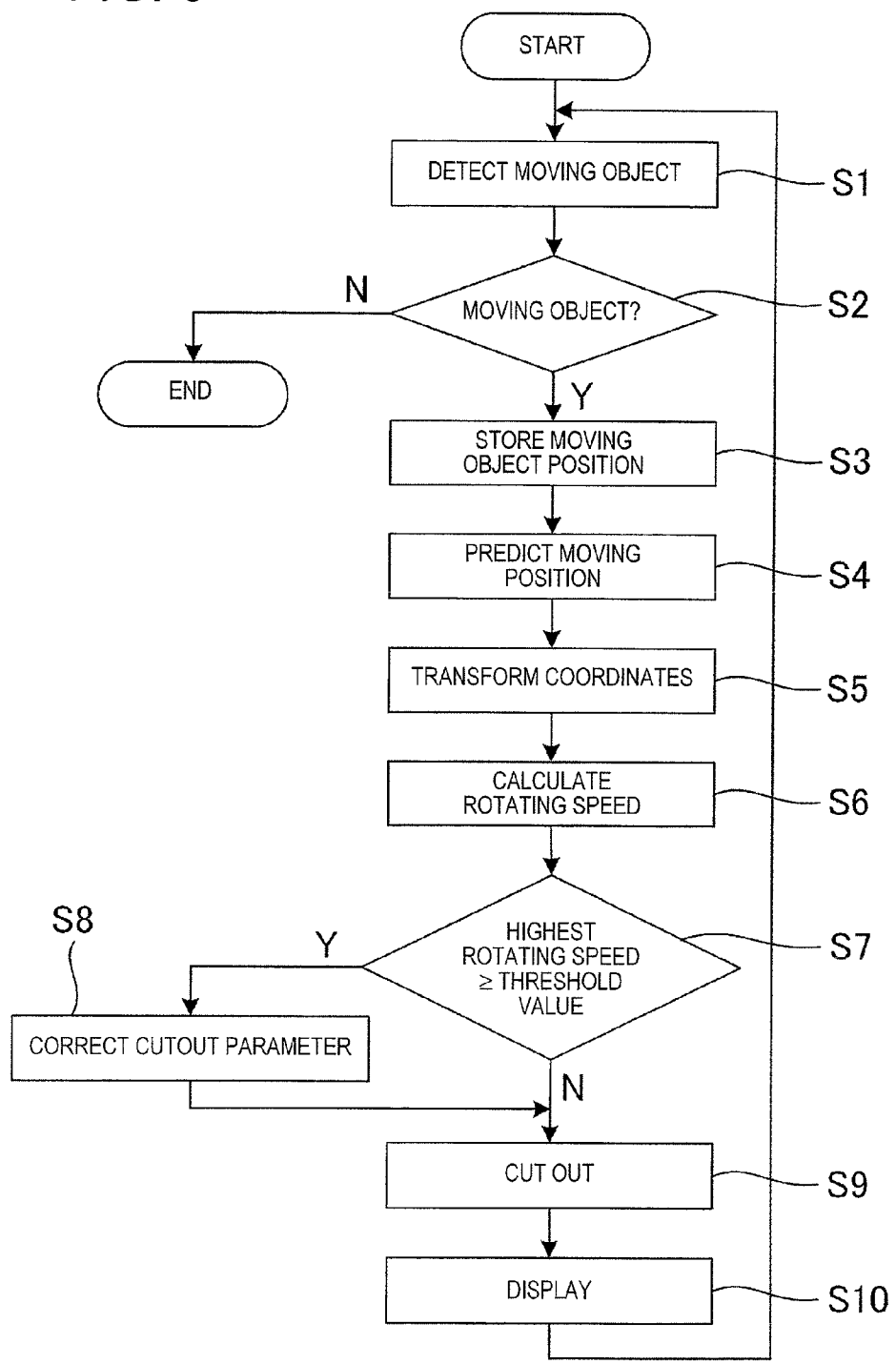
FIG. 5 is a flowchart illustrating the operation of the image display device in FIG. 1.

Subsequently, the operation of the image display device 1 according to this embodiment will be described. FIG. 5 is a flowchart illustrating the operation of the image display device 1. In the figure, when the omnidirectional image input unit 10 receives the omnidirectional images from the omnidirectional camera not shown, the moving object detection unit 11 detects the moving object (moving object to be tracked) (Step S1), and determines whether the moving object to be tracked could be detected, or not (Step S2). If the moving object to be tracked could not be detected, this processing is completed, and if the moving object to be tracked could be detected, the position of the moving object is output. The moving object position storage unit 12 stores the position of the moving object output from the moving object detection unit 11 (Step S3). When the position of the moving object is stored, the moving position prediction unit 13 predicts a subsequent moving position from the position of the moving object, which has been stored in the moving object position storage unit 12 (Step S4). Then, the coordinate transformation unit 14 transforms the position of the moving object, which has been predicted by the moving position prediction unit 13, into the coordinates on the real space plane (Step S5).

Then, the rotating speed calculation unit 15 calculates the rotating speed according to the predicted position that has been subjected to the coordinate transformation on the real space plane (Step S6), and determines whether the calculated rotating speed is equal to or larger than the threshold value, or not (Step S7). If the calculated rotating speed is equal to or larger than the threshold value, the cutout parameter correction unit 16 corrects the cutout parameter so that the cutout parameter becomes smaller than the threshold value (Step S8). After the parameter has been corrected, the cutout unit 17 cuts the images including the moving object out of the omnidirectional image by the aid of the corrected cutout parameter (Step S9). Then, the display unit 18 displays the cutout image (Step S10). After this processing has been completed, the flow is returned to Step S1, and the same processing is repeated. Also, if the rotating speed calculated by the rotating speed calculation unit 15 is smaller than the threshold value in the determination of Step S7, the cutout parameter is not corrected, and the flow is shifted to the cutout processing as it is.

Thus, according to the image display device 1 of this embodiment, the subsequent position is predicted based on the current position of the moving object, and the coordinates of the predicted moving position are transformed into the coordinates on the real space plane, and the rotating speed in the image direction is calculated based on the coordinates on the real space plane. If the highest rotating speed of the calculated rotating speeds is equal to or larger than the given threshold value, the cutout parameter for setting the upward direction of the cutout images is corrected, and the images including the moving object are cut out of the omnidirectional image by the aid of the corrected cutout parameter, and displayed. Accordingly, since the rotating speed is adjusted and cut out when the images including the moving object are cut out of the omnidirectional image, a rotation change in the cutout images including the moving object is suppressed when the camera tracks the moving object that passes nearly under the omnidirectional camera. As a result, the cutout images are not hard to view. That is, the image display is more easily viewable than the conventional one.

Figure 6:
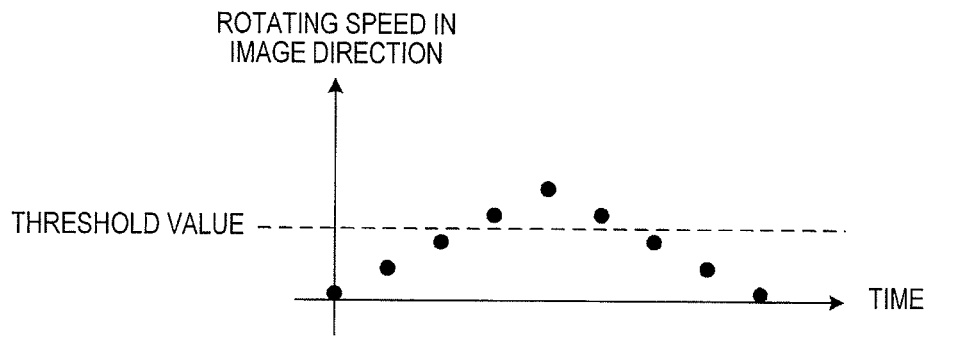
FIG. 6 is a diagram illustrating the operation of one applied example of a rotating speed control in the image display device in FIG. 1.
Figure 6:
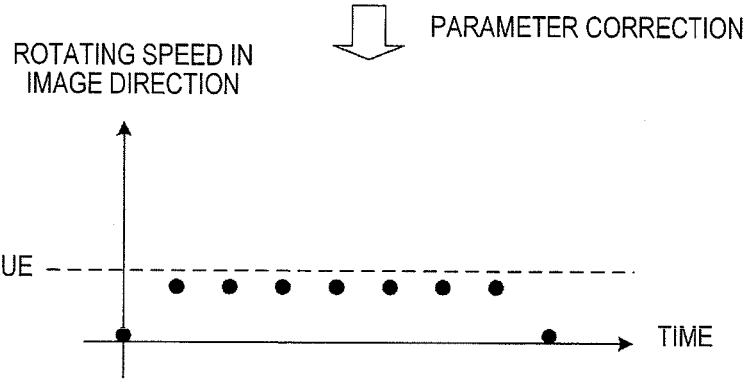

In the above embodiment, as illustrated in FIG. 4, the cutout parameter for setting the upward direction of the cutout images is corrected when the highest rotating speed is equal to or larger than the given threshold value. Alternatively, as illustrated in FIG. 6, the rotating speed may be controlled to a given value except for the image at the time of starting the cutout and the image at the time of ending the cutout. The image display is still more easily viewable by controlling the rotating speed to the given value.

Figure 7:
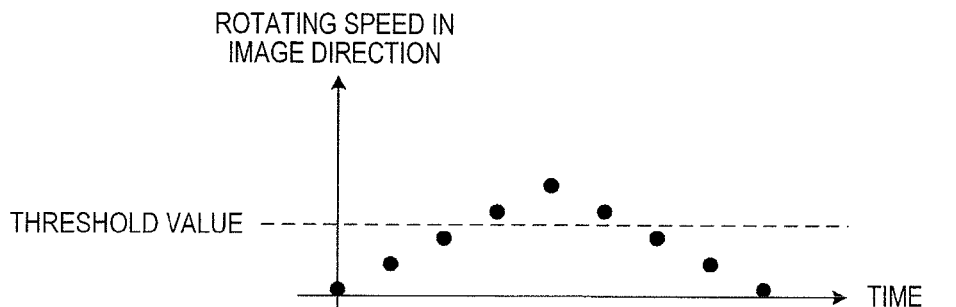
FIG. 7 is a diagram illustrating the operation of another applied example of the rotating speed control in the image display device in FIG. 1.
Figure 7:
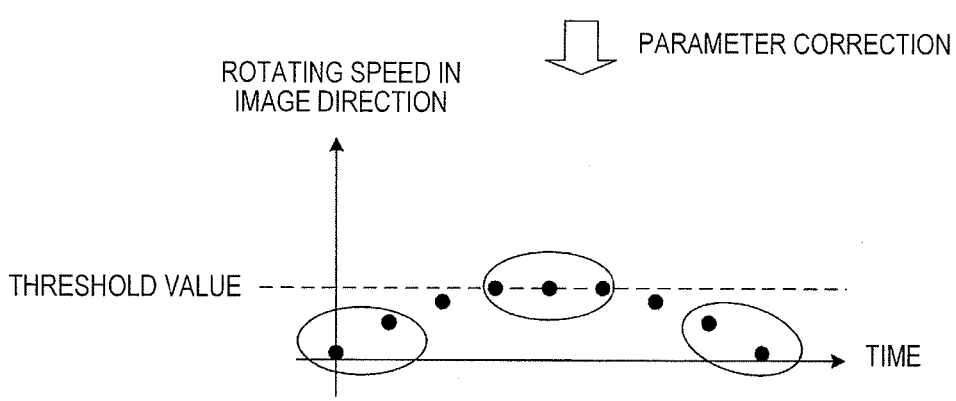

Also, as illustrated in FIG. 7, the parameter may be corrected so that the rotating speed is suppressed at times when the highest rotating speed exceeds a given threshold value (portion indicated by a center oval), and the rotating speed is increased at other times (portions indicated by ovals at both ends thereof). As a result, the visibility in the parameter correction zone can be more enhanced.

Figure 8:
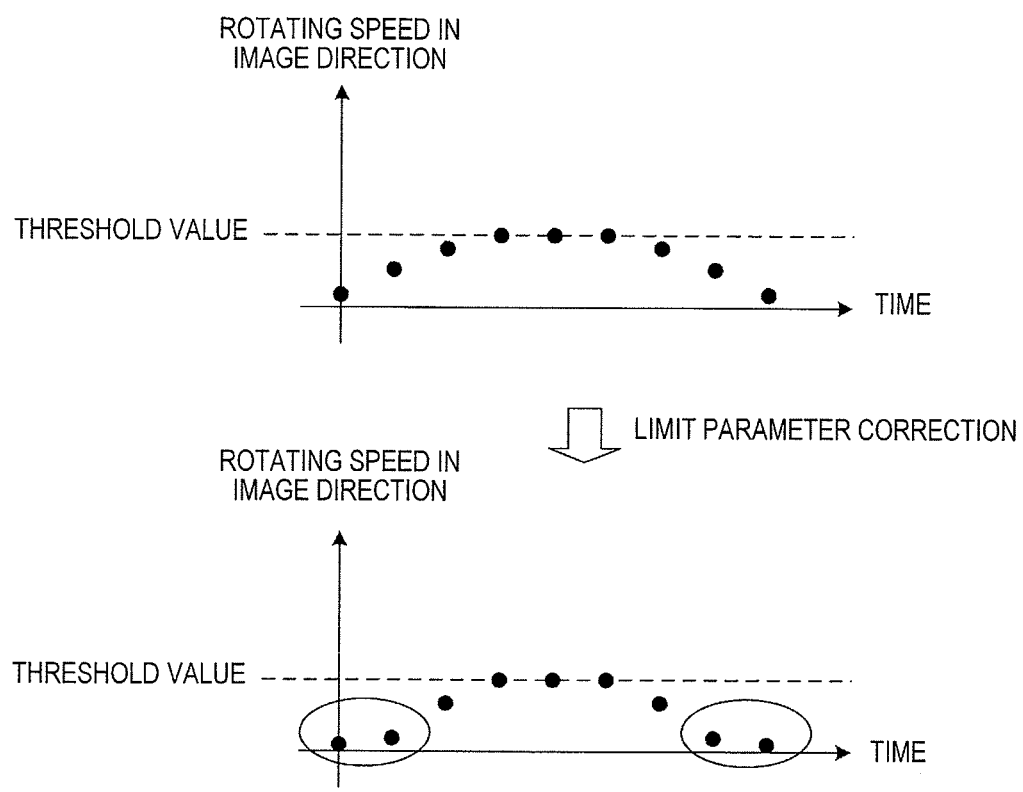
FIG. 8 is a diagram illustrating the operation of still another applied example of the rotating speed control in the image display device in FIG. 1.

Also, as illustrated in FIG. 8, correction may be conducted so that the amount of correction is decreased on both ends of the zone in which the parameter correction is conducted (portions indicated by ovals), and the amount of correction is increased in the center portion. As a result, the connection with the zone in which there is no parameter correction can be smoothed.

Figure 9A:
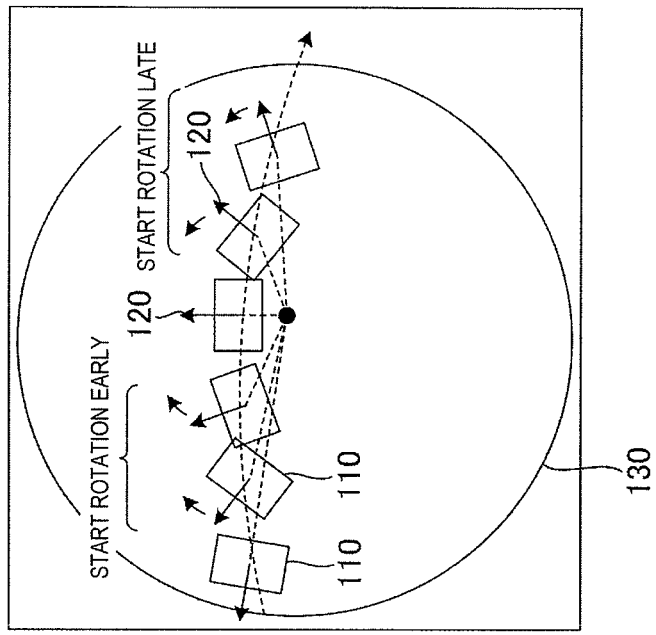
FIGS. 9A and 9B are diagrams illustrating the operation of yet still another applied example of the rotating speed control in the image display device in FIG. 1.
Figure 9B:
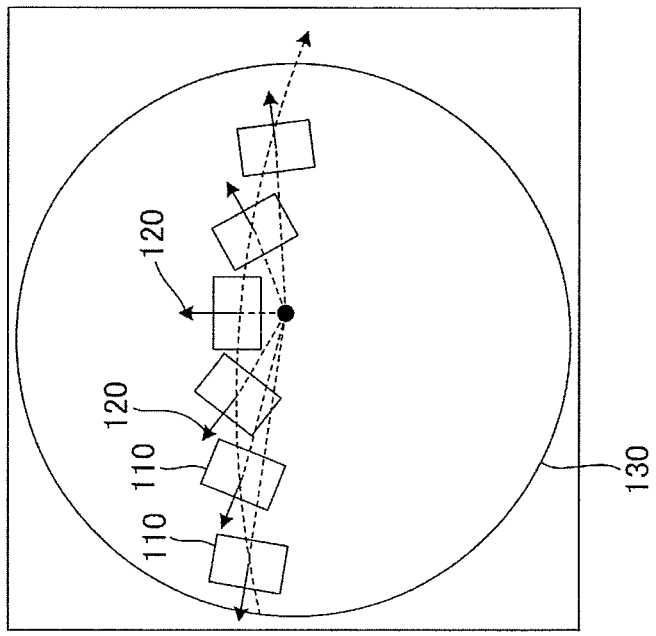

Also, particularly in the case where the moving object passes nearly under the omnidirectional camera, it is desirable that the cutout parameter is corrected so that the rotation starts early according to the traveling direction and the speed when the moving object comes closer to under the camera, while the rotating speed of the cutout image is reduced to a given value or smaller. Also, it is desirable that the cutout parameter is corrected so that the rotation starts late according to the traveling direction and the speed after the moving object has passed nearly under the camera. This appearance is illustrated in FIG. 9A. FIG. 9B is a diagram illustrating the cutout of an image in the conventional art.

Second Embodiment

Figure 10:
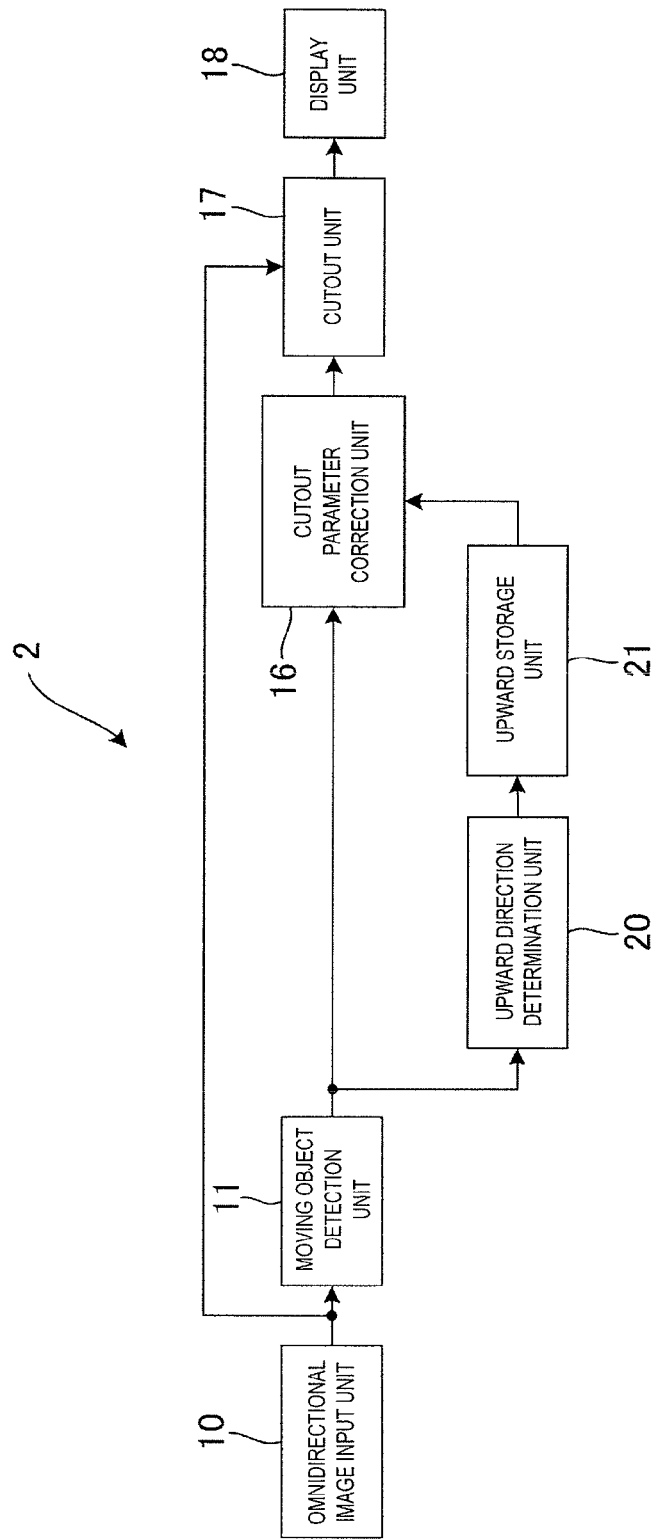
FIG. 10 is a block diagram illustrating a rough configuration of an image display device according to a second embodiment of the present invention.

FIG. 10 is a block diagram illustrating a rough configuration of an image display device according to a second embodiment of the present invention. In the figure, parts common to those described above in FIG. 1 are denoted by identical symbols, and their description will be omitted.

The image display device 1 according to the above-mentioned first embodiment changes the direction of cutting out the images (directions of arrows). On the other hand, an image display device 2 according to the second embodiment is designed to cut out the images while the direction of the arrows is fixed to the upward direction. In order to realized this, the image display device 2 according to this embodiment includes an upward direction determination unit 20 that determines an upward direction at the time of cutting out the images when the moving object detected by the moving object detection unit 11 enters an upward direction fixed area, and an upward storage unit 21 that stores the upward direction at the time of culling out the images, which has been determined by the upward direction determination unit 20. The cutout parameter correction unit 16 corrects the cutout parameter based on the upward direction at the time of cutting out the images, which has been stored in the upward storage unit 21, when the moving object is located within the upward direction fixed area. The cutout unit 17 cuts the images including the moving object out of the omnidirectional image by the aid of the cutout parameter corrected by the cutout parameter correction unit 16. The display unit 18 displays the images including the moving object, which have been cut out by the cutout unit 17.

Figure 21:
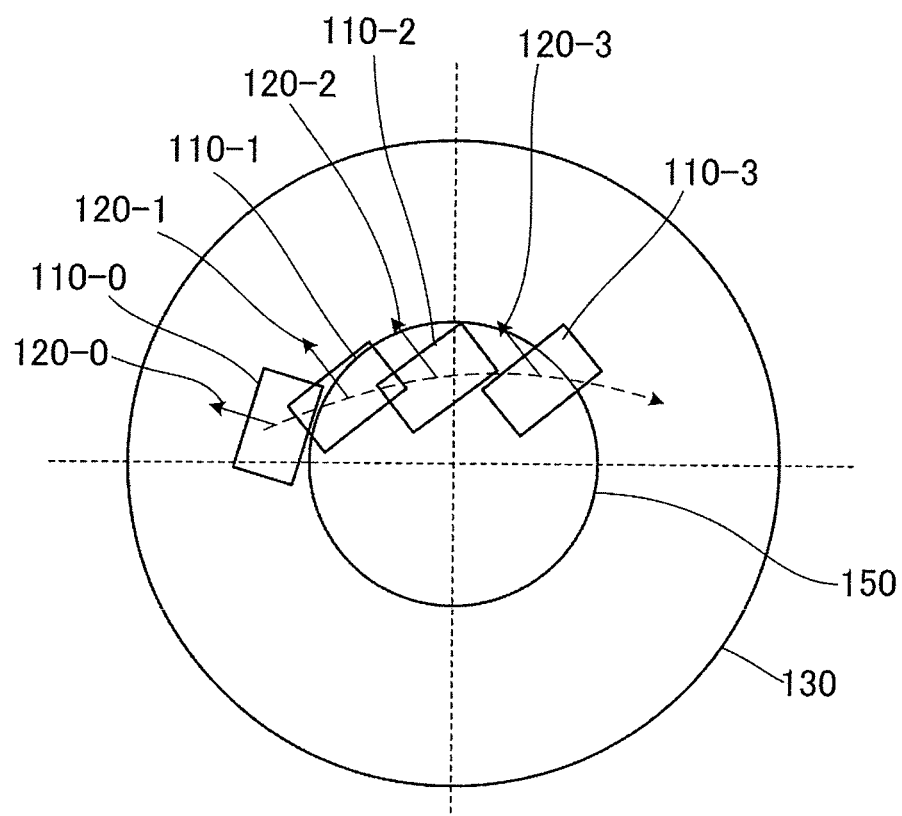
FIG. 21 is a diagram illustrating an upward direction fixed area.

FIG. 21 is a diagram illustrating the upward direction fixed area. A method of fixing the upward direction will be described in detail with reference to FIG. 21. The moving object travels as indicated by broken arrows in the figure. Reference numeral 110-0 to 110-3 represent the cutout images at the respective times, and 120-0 to 120-3 represent the upward directions at the respective times. Reference numeral 150 denotes the upward direction fixed area. Until the moving object enters the upward direction fixed area 150, the parameter is not corrected, and the normal cutout image is created. The upward direction 120-0 of the cutout image 110-0 represents that a direction of a line segment extending from a center of the image toward the moving object is the upward direction of the cutout image.

Then, the upward direction when the moving object enters the upward direction fixed area 150 is stored. In this case, the upward direction 120-1 is stored. Subsequently, the cutout images are created in which the parameter is corrected so that the upward directions of the cutout images within the upward direction fixed area 150 are fixed to the same direction as the upward direction 120-1.

Figure 11:
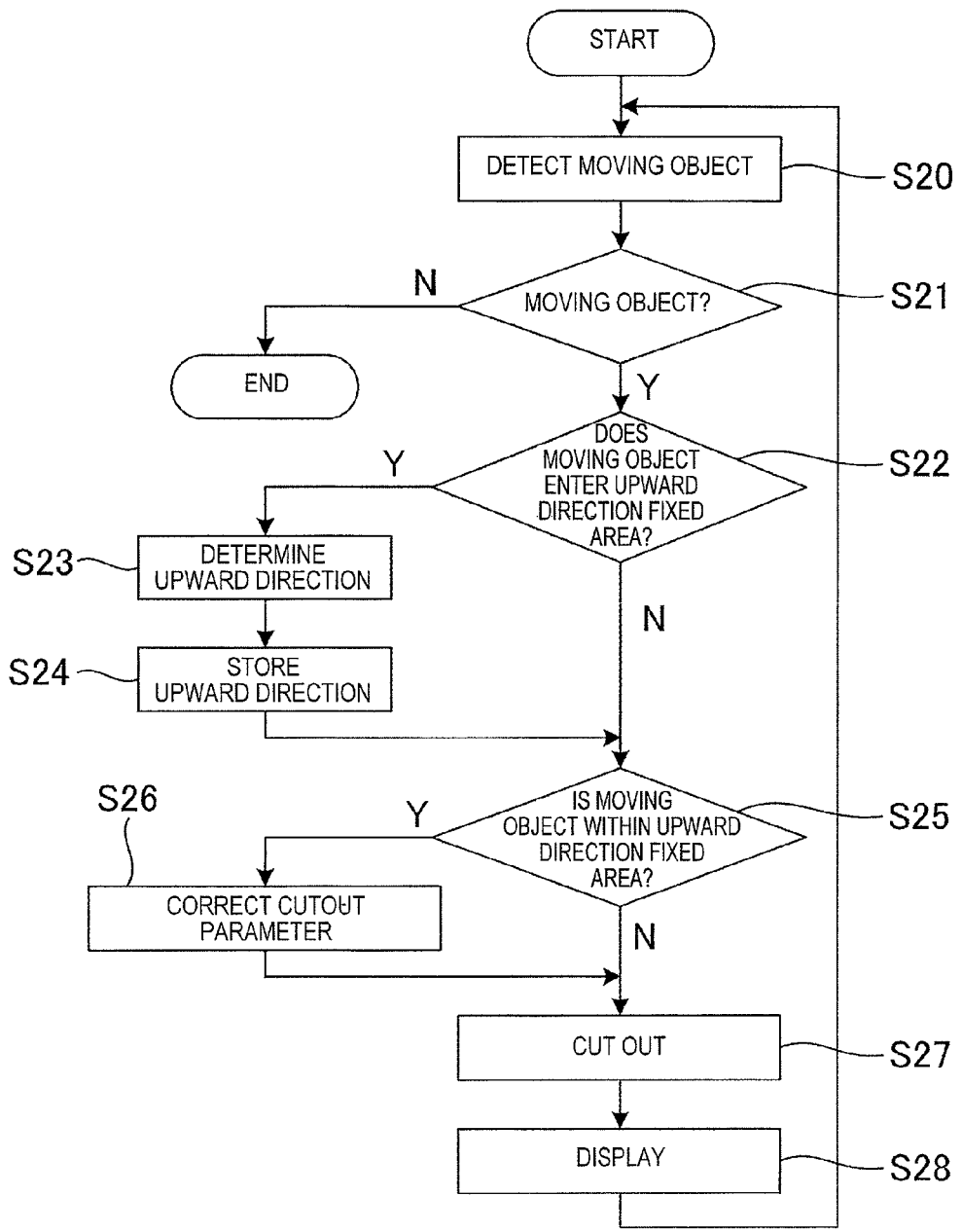
FIG. 11 is a flowchart illustrating the operation of the image display device in FIG. 10.

FIG. 11 is a flowchart illustrating the operation of the image display device 2 according to this embodiment. In the figure, when the omnidirectional image input unit 10 receives the omnidirectional image from the omnidirectional camera not shown, the moving object detection unit 11 detects the moving object (moving object to be tracked) (Step S20), and determines whether the moving object to be tracked could be detected, or not (Step S21). If the moving object to be tracked could not be detected, this processing is completed. If the moving object to be tracked could be detected, it is determined whether the moving object has entered a predetermined upward direction fixed area, or not (Step S22). If the moving object to be tracked has entered the upward direction fixed area, the upward direction of the moving object is determined (Step S23), and the determined upward direction is then stored (Step S24). On the other hand, if the moving object to be tracked does not enter the upward direction fixed area in the determination of Step S22, the flow is shifted to the subsequent Step S25 without conducting any processing.

If the moving object to be tracked has entered the upward direction fixed area, and the upward direction has been determined and stored, or does not enter the upward direction fixed area, it is determined whether the moving object to be tracked is located within the upward direction fixed area, or not (Step S25). If the moving object to be tracked is located with the upward direction fixed area, the cutout parameter, that is, the parameter that determines the upward direction is corrected (Step 26). If the moving object to be tracked is located outside of the upward direction fixed area, or after the cutout parameter has been corrected within the upward direction fixed area, the cutout unit 17 cuts the images including the moving object out of the omnidirectional image by the aid of the corrected cutout parameter (Step S27). When the cutout unit 17 then cuts the images including the moving object out of the omnidirectional image, the display unit 18 displays the images (Step S28). After this processing has been completed, the flow is returned to Step S20, and the same processing is repeated.

Thus, according to the image display device 2 of this embodiment, the upward direction at the time of cutting out the image is determined when the moving object enters the upward direction fixed area, and the upward direction at that time is stored. When the moving object is located within the upward direction fixed area, the cutout parameter is corrected based on the stored upward direction at the time of cutting out the image, and the images including the moving object are cut out of the omnidirectional image by the aid of the cutout parameter, and displayed. Accordingly, since the images including the moving object are cut out of the omnidirectional image in a state where the upward direction is fixed, the image display is always easily viewable without any rotation change in the cutout images including the moving object when the camera tracks the moving body that passes nearly under the omnidirectional camera, and without turning the cutout images upside down when the moving object passes under the omnidirectional camera.

Third Embodiment

Figure 12:
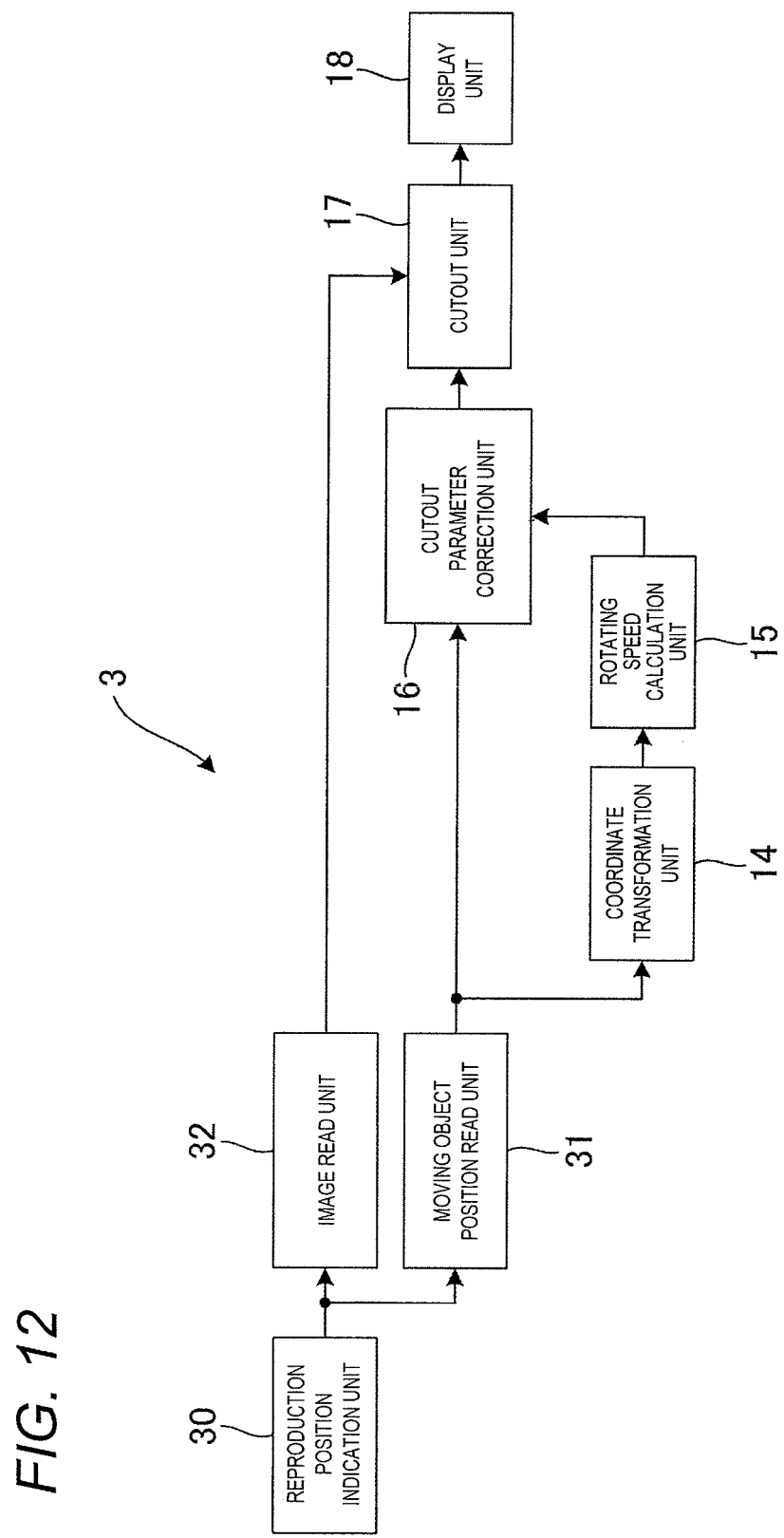
FIG. 12 is a block diagram illustrating a rough configuration of an image display device according to a third embodiment of the present invention.

FIG. 12 is a block diagram illustrating a rough configuration of an image display device according to a third embodiment of the present invention. In the figure, parts common to those described above in FIG. 1 are denoted by identical symbols, and their description will be omitted.

The image display device 1 according to the above-mentioned first embodiment predicts the direction of the moving object in real time, subjects the predicted moving position to the coordinate transformation to calculate the rotating speed, and corrects the cutout parameter according to the calculated rotating speed. On the other hand, an image display device 3 according to the third embodiment is designed to read the moving position of the moving object out of a recorded image, subject the read moving position to coordinate transformation to calculate the rotating speed, and correct the cutout parameter according to the calculated rotating speed. That is, with the use of the recorded image, the processing can be advanced without predicting the moving position of the moving object.

Referring to FIG. 12, the image display device 3 according to this embodiment includes a reproduction position indication unit 30 that indicates a position to be reproduced, a moving object position read unit 31 that reads the position of the moving object from an omnidirectional image recorded in advance, an image read unit 32 that reads the image from the indicated reproduction position, and the coordinate transformation unit 14 that transforms the coordinates of the position of the moving object read by the moving object position read unit 31 into coordinates on a real space plane. The image display device 3 also includes the rotating speed calculation unit 15 that calculates the rotating speed in the image direction based on the coordinates on a real space, which have been obtained by the coordinate transformation unit 14, the cutout parameter correction unit 16 that corrects the cutout parameter when the highest rotating speed of the rotating speeds calculated by the rotating speed calculation unit 15 is equal to or larger than a given threshold value, the cutout unit 17 that cuts the images including the moving object out of the omnidirectional image by the aid of the cutout parameter corrected by the cutout parameter correction unit 16, and the display unit 18 that displays the images including the moving object, which have been cut out by the cutout unit 17.

Figure 14:
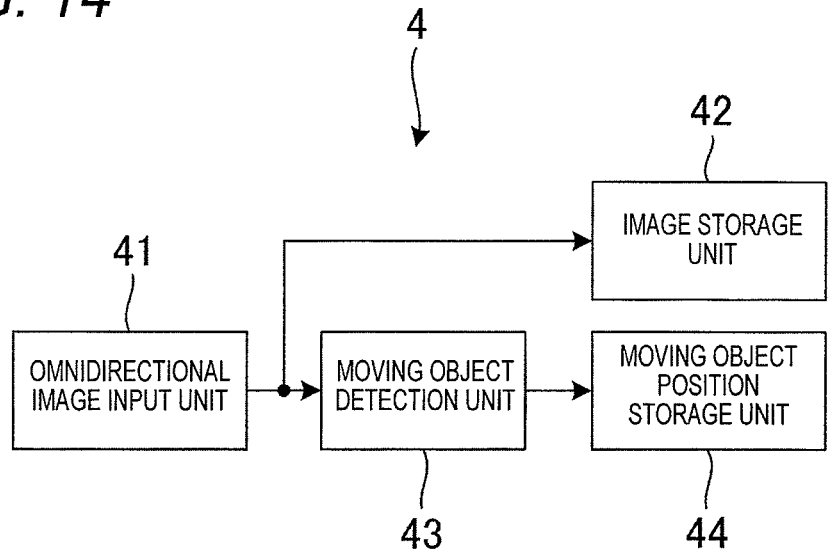
FIG. 14 is a block diagram illustrating a rough configuration of an image recording device used in the image display device of FIG. 12.

On the other hand, FIG. 14 is a block diagram illustrating a rough configuration of an image recording device 4 used in the image display device 3 according to this embodiment. In the figure, the image recording device 4 includes an omnidirectional image input unit 41, an image storage unit 42, a moving object detection unit 43, and a moving object position storage unit 44. The omnidirectional image input unit 41 receives an omnidirectional image from an omnidirectional camera not shown. The image storage unit 42 stores the omnidirectional image from the omnidirectional camera, which has been received by the omnidirectional image input unit 41. The moving object detection unit 43 detects the moving object tracked from the omnidirectional image received by the omnidirectional image input unit 41. The moving object position storage unit 44 stores the position of the moving object, which has been detected by the moving object detection unit 43.

Figure 13:
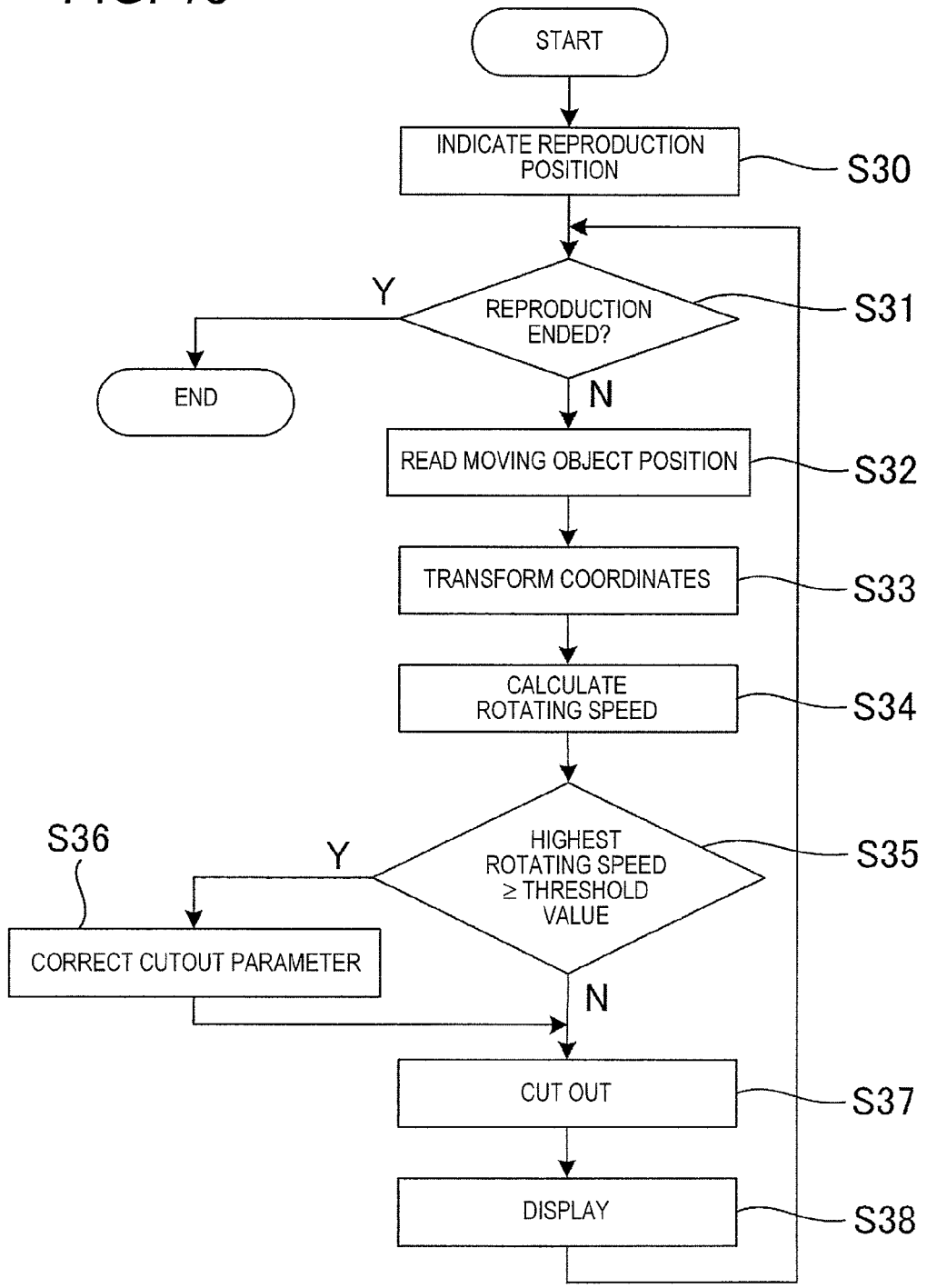
FIG. 13 is a flowchart illustrating the operation of the image display device in FIG. 12.

Subsequently, the operation of the image display device 3 according to this embodiment will be described. FIG. 13 is a flowchart illustrating the operation of the image display device 3. In the figure, the reproduction position indication unit 30 indicates a reproduction position according to a user's instruction (Step S30). Then, it is determined whether the reproduction has been completed, or not (Step S31). If the reproduction has been completed, this processing is completed. If the reproduction is not completed, the moving object position read unit 31 reads the position of the moving object whose reproduction position has been designated from the moving object position storage unit 44 in the image recording device 4 (Step S32). Then, the moving object position read unit 31 transfers the read position of the moving object to the coordinate transformation unit 14, and the coordinate transformation unit 14 transforms the position of the moving object into the coordinates on the real space plane (Step S33).

Then, the rotating speed calculation unit 15 calculates the rotating speed from the position of the moving object, which has been subjected to the coordinate transformation on the real space plane (Step S34), and determines whether the calculated rotating speed is equal to or larger than the threshold value, or not (Step S35). If the calculated rotating speed is equal to or larger than the threshold value, the cutout parameter correction unit 16 corrects the cutout parameter so that the cutout parameter becomes smaller than the threshold value (Step S36). After the parameter has been corrected, the cutout unit 17 cuts the images including the moving object out of the omnidirectional image read by the image read unit 32 by the aid of the corrected cutout parameter (Step S37). Then, the display unit 18 displays the cutout image (Step S38). After this processing has been completed, the flow is returned to Step S31, and the same processing is repeated until the reproduction has been completed. Also, if the rotating speed calculated by the rotating speed calculation unit 15 is smaller than the threshold value in the determination of Step S35, the cutout parameter is not corrected, and the flow is shifted to the cutout processing as it is.

Figure 15:
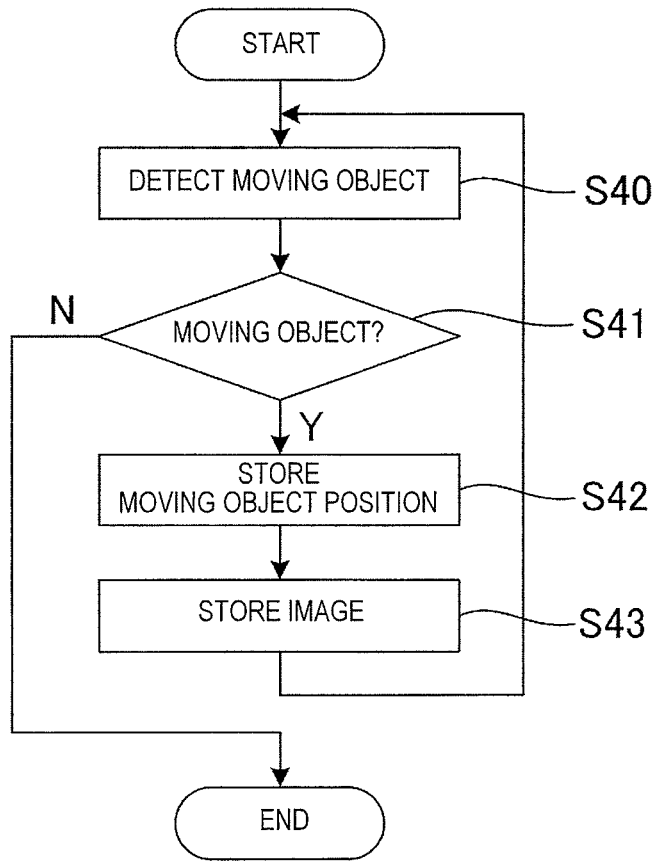
FIG. 15 is a flowchart illustrating the operation of the image recording device in FIG. 14.
Figure 16:
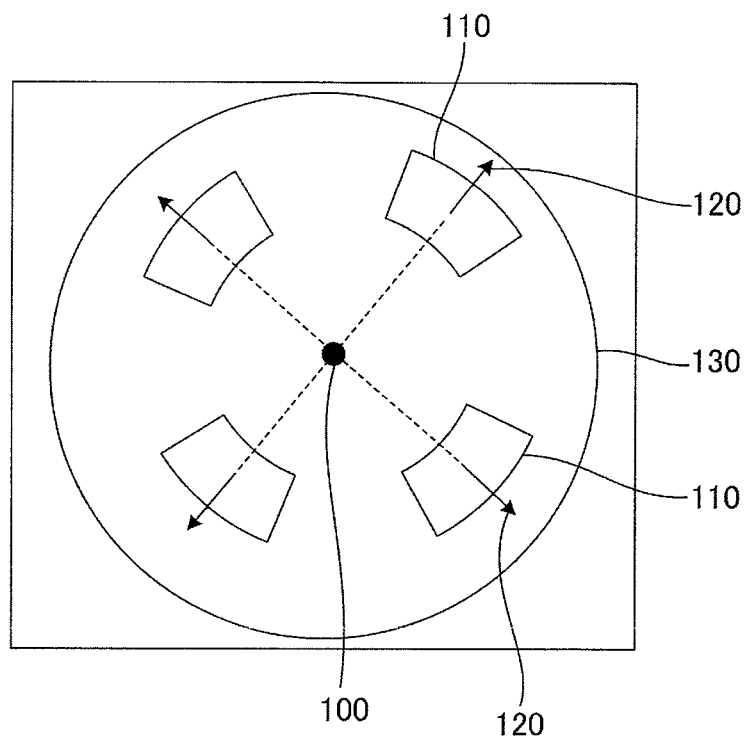
FIG. 16 is a diagram illustrating the operation of cutting images out of an omnidirectional image.
Figure 17:
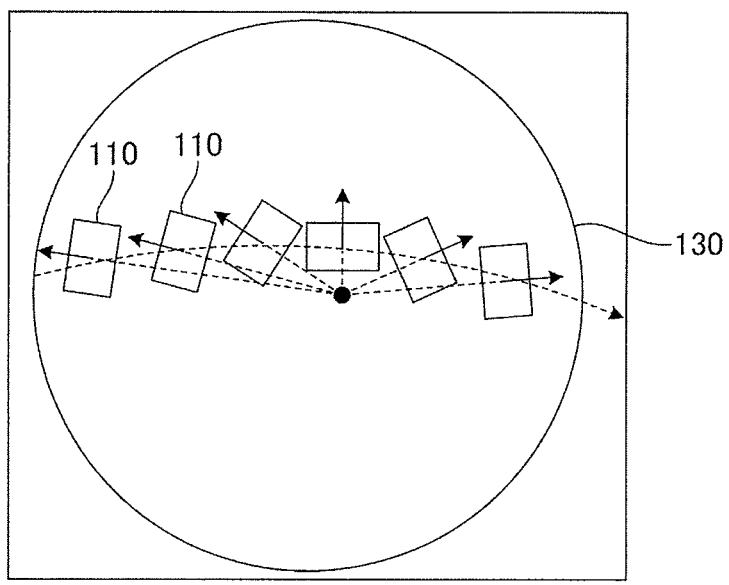
FIG. 17 is a diagram illustrating one problem caused by cutting images out of an omnidirectional image in a conventional art.
Figure 18:
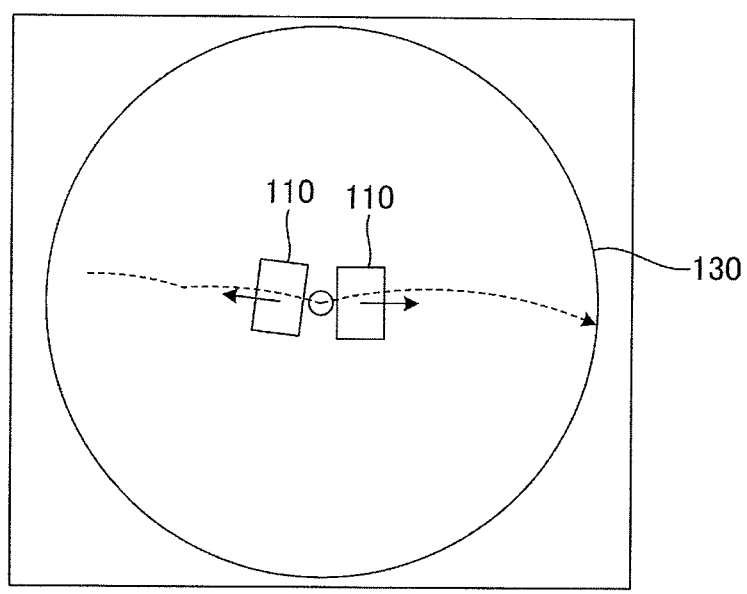
FIG. 18 is a diagram illustrating another problem caused by cutting the images out of the omnidirectional image in the conventional art.

Subsequently, a description will be given of the operation of the image recording device 4 used in the image display device 3 according to this embodiment. FIG. 15 is a flowchart illustrating the operation of the image recording device 4. In the figure, when the omnidirectional image input unit 41 receives the omnidirectional image from the omnidirectional camera not shown, the moving object detection unit 43 detects the moving object (moving object to be tracked) (Step S40), and determines whether the moving object to be tracked could be detected, or not (Step S41). If the moving object to be tracked could not be detected, this processing is completed. If the moving object to be tracked could be detected, the moving object position storage unit 44 stores the position of the moving object (Step S42). Then, the image storage unit 42 stores the omnidirectional image received by the omnidirectional image input unit 41 (Step S43). The processing of the above Steps S40 to S43 is repeated until the moving body is not detected.

Thus, according to the image display device 3 of this embodiment, the position of the moving object is read out of the omnidirectional image recorded in advance, and the coordinates of the position are transformed into the coordinates on the real space plane. Then, the rotating speed in the image direction is calculated based on the coordinates on the real space plane, and the cutout parameter for setting the upward direction of the cutout image is corrected when the highest rotating speed of the calculated rotating speeds is equal to or larger than the given threshold value.

Accordingly, since the recorded omnidirectional image is dealt with, the position prediction of the moving object becomes unnecessary, and means for storing the moving object position (the above-mentioned moving object position storage unit 12) and means for predicting the moving object position (the above-mentioned moving position prediction unit 13) become unnecessary, with the results that the costs of the single-body image display device are reduced. The images are cut out in the same manner as that in the first embodiment described above, and the rotating speed is adjusted when the images including the moving object are cut out of the omnidirectional image. Therefore, a rotation change in the cutout images including the moving object is suppressed when the camera tracks the moving object that passes nearly under the omnidirectional camera. As a result, the cutout images are not hard to view. That is, the image display is more easily viewable than the conventional one.

Fourth Embodiment

Figure 19:
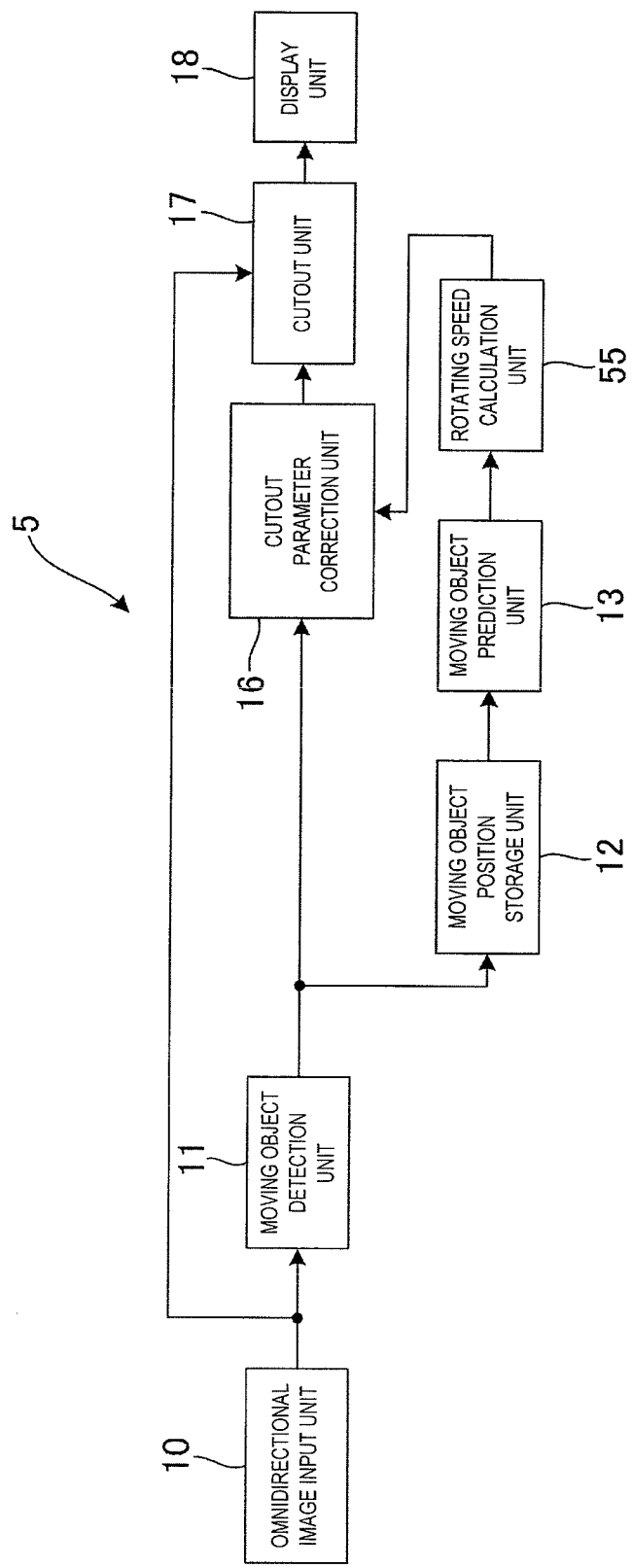
FIG. 19 is a block diagram illustrating a rough configuration of an image display device according to a fourth embodiment of the present invention.

FIG. 19 is a block diagram illustrating a rough configuration of an image display device according to a fourth embodiment of the present invention. In the figure, parts common to those described above in FIG. 1 are denoted by identical symbols, and their description will be omitted.

The image display device 1 according to the above-mentioned first embodiment determines whether the rotating speed exceeds the threshold value, based on the rotating speed of the image on the real space. That is, with the use of the rotating speed of the image on the real space, an accurate rotating speed can be obtained, for example, even when the camera is installed obliquely on a floor, or when the parameter is corrected. However, because the amount of calculation is increased in order to obtain the rotating speed of the image in the real space, the parameter may be corrected by the aid of only the rotating speed within the omnidirectional image without development into the real space when a processing load is intended to be reduced rather than precision. An image display device 5 according to this embodiment is designed to determine whether the rotating speed exceeds a threshold value, based on the rotating speed of the image, which has been obtained from the omnidirectional image. Because development processing into the real space becomes unnecessary, the amount of calculation when obtaining the rotating speed can be reduced.

Figure 20:
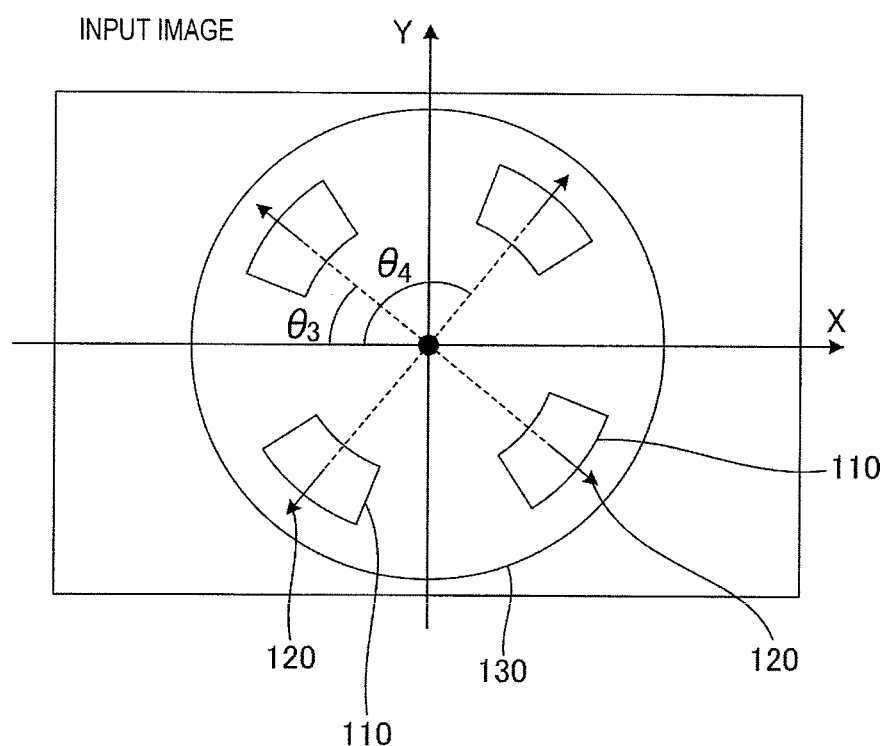
FIG. 20 is a diagram illustrating an upward direction on the omnidirectional image.

A rotating speed calculation unit 55 obtains the rotating speed of the image from the upward direction of the image corresponding to a predicted position of the moving object, which has been obtained from the moving position prediction unit 13 (direction of a vector from a center of the omnidirectional image toward the moving object). FIG. 20 is a diagram illustrating the upward direction of the image on the omnidirectional image. The rotating speed can be calculated by the aid of an angular difference ($\theta_4-\theta_3$) between the two vectors. A method in which the development into the real space is not conducted can be realized even in the image display device 3 according to the third embodiment, likewise.

Although the present invention is described in detail with reference to specific embodiments, it is obvious to the skilled person that various changes or modifications may be made without departing from spirit and scope of the present invention.

This application is base on the Japanese patent application (Application No. 2010-047863) filed on Mar. 4, 2010, the contents of which are incorporated herein by reference.

INDUSTRIAL APPLICABILITY

The present invention provides advantages that a rotation change of the cutout images each including the moving object is suppressed when the omnidirectional camera tracks the moving object that passes nearly under the omnidirectional camera, and also the cutout images flips vertically when the moving object passes under the omnidirectional camera, whereby easily viewable image display is always enabled. The present invention is applicable to a security camera system using an omnidirectional camera that acquires an omnidirectional image.

DESCRIPTION OF REFERENCE SIGNS 1, 2, 3, 5: Image Display Device
4: Image Recording Device
10, 41: Omnidirectional Image Input Unit
11, 43: Moving Object Detection Unit
12, 44: Moving Object Position Storage Unit
13: Moving Position Prediction Unit
14: Coordinate Transformation Unit
15, 55: Rotating Speed Calculation Unit
16: Cutout Parameter Correction Unit
17: Cutout Unit
18: Display Unit
20: Upward Direction Determination Unit
21: Upward Storage Unit
30: Reproduction Position Indication Unit
31: Moving Object Position Read Unit
32: Image Read Unit
42: Image Storage Unit
110: Cutout Image
120: Upward Direction Of Cutout Image
130: Omnidirectional Image

The invention claimed is:

1. An image display device configured to cut out and display a moving object within an omnidirectional image, said image display device comprising:
a moving object position acquirer configured to acquire a position of the moving object within the omnidirectional image;
a determiner configured to determine whether to correct an upward direction of a cutout image;
a parameter corrector configured to correct a cutout parameter when the determiner determines to correct the upward direction of the cutout image;
a cutout device configured to cut images including the moving object out of the omnidirectional image based on the cutout parameter corrected by the parameter corrector;
a display configured to display the images including the moving object, which are cut out by the cutout device; and
a rotating speed calculator configured to calculate a rotating speed of the image in a case in which the image is displayed without correction of the upward direction of the cutout image, based on coordinates of a moving position of the moving object within the omnidirectional image, which are acquired by the moving object position acquirer,
wherein the determiner determines to correct the upward direction of the cutout image when a highest rotating speed of the rotating speeds calculated by the rotating speed calculator is equal to or larger than a given threshold value.

2. The image display device according to claim 1, further comprising:
a coordinate converter configured to transform the coordinates of the moving position of the moving object, which are acquired by the moving object position acquirer, to coordinates on a real space plane;
wherein the rotating speed calculator is configured to calculate the rotating speed of the image based on the coordinates on the real space plane which are obtained by the coordinate converter.

3. The image display device according to claim 1,
wherein the moving object position acquirer comprises:
a moving object detector configured to detect the moving object according to the omnidirectional image;
a moving object position storage configured to store a position of the moving object which is detected by the moving object detector; and
a moving position predictor configured to predict the moving position of the moving object based on the position of the moving object which is stored in the moving object position storage.

4. The image display device according to claim 1,
wherein the moving object position acquirer reads the position of the moving object according to the omnidirectional image recorded in advance.

5. The image display device according to claim 1, further comprising:
    an upward direction determiner configured to determine the upward direction of cutout of the image when the moving object enters an upward direction fixed area; and
    an upward direction storage configured to store the upward direction of the cutout of the image which is determined by the upward direction determiner,
    wherein the determiner determines to correct the upward direction of the cutout image when the moving object is located in the upward direction fixed area based on the coordinates of the moving position of the moving object within the omnidirectional image, which is acquired by the moving object position acquirer.

6. An image display method for cutting out and displaying a moving object within an omnidirectional image, said image display method comprising:
    a moving object position acquisition step of acquiring, by a moving object position acquirer, a position of the moving object within the omnidirectional image;
    a determination step of determining, by a determiner, whether to correct an upward direction of a cutout image;
    a parameter correction step of correcting, by a parameter corrector, a cutout parameter when it is determined in the determination step to correct the upward direction of the cutout image;
    a cutout step of cutting images, by a cutout device, including the moving object out of the omnidirectional image based on the cutout parameter corrected in the parameter correction step;
    a display step of displaying, by a display, the images including the moving object, which are cut out in the cutout step; and
    a calculation step of calculating, by a rotating speed calculator, a rotating speed of the image in a case in which the image is displayed without correction of the upward direction of the cutout image, based on coordinates of a moving position of the moving object within the omnidirectional image, which are acquired by the moving object position acquirer,
    wherein the determiner determines to correct the upward direction of the cutout image when a highest rotating speed of the rotating speeds calculated by the rotating speed calculator is equal to or larger than a given threshold value.

* * * * *